W. A. SHAW.
Solder Joints for Pipes.

No. 151,166.    Patented May 19, 1874.

Witnesses.
M. D. Jewell,
Wm. C. Chaffee.

Inventor.
William Anthony Shaw
by atty Pollok

AM. PHOTO-LITHOGRAPHIC Co. N.Y. (OSBORNE'S PROCESS.)

UNITED STATES PATENT OFFICE.

WILLIAM A. SHAW, OF NEW YORK, N. Y., ASSIGNOR OF ONE-HALF HIS RIGHT TO L. H. ROGERS, OF SAME PLACE.

IMPROVEMENT IN SOLDER-JOINTS FOR PIPES.

Specification forming part of Letters Patent No. 151,166, dated May 19, 1874; application filed May 5, 1874.

*To all whom it may concern:*

Be it known that I, WILLIAM ANTHONY SHAW, of the city, county, and State of New York, have invented certain new and useful Improvements in Solder-Joints for Lead and other Pipes, of which the following is a specification:

This invention is intended to facilitate the soldering of joints of lead and other pipes. Considerable difficulty is usually experienced in joining such pipes, and to make a tight and perfect joint requires the skill of an experienced workman. To obviate the expense and difficulty hitherto incurred in making good solder-joints, and to enable not only the skilled workman, but as well one having little or no experience in the business, to make said joints accurately and with ease, I have devised a mode of forming the joint by means of what I term a solder-lined sleeve—that is to say, a sleeve or tube of lead or other metal or alloy lined with tin, solder, or fusible metal having a lower fusing-point than the outer sleeve or tube, so that the application of heat to the latter will melt down the solder lining. Into this sleeve the contiguous ends of the two pipes to be joined are inserted, and then, by external application of heat to the sleeve, the solder lining will be melted down and caused to form a perfect soldered joint, which, moreover, will be shielded and protected by the surrounding metallic sleeve.

The solder-lined sleeves can be produced by lining a tube of the harder metal with the solder or more fusible metal by any of the processes usually practiced in analogous cases, and then cutting up this solder-lined tube into sleeves of proper length.

Figure 1:
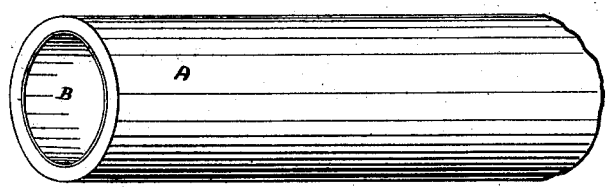
Figure 2:
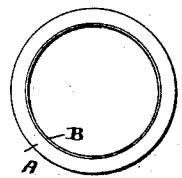

In the accompanying drawing a piece of such a tube is represented in perspective in Figure 1, and in end view in Fig. 2.

A is the hard-metal sleeve, and B the solder lining.

Or the sleeve may be made by casting the outer harder metallic portions in molds, and then casting their linings within them.

In using the solder-lined sleeve the pipes to be joined together are to be prepared in the usual manner, and their ends brought together within the sleeve. Heat is then applied by means of soldering coppers or tongs, or by pouring hot sand or molten metal upon the sleeve until the lining thereof fuses, and, uniting with the pipe, makes a perfect joint.

The sleeves may be made into T's, branches, or any shapes by casting; or they may be so formed from tubes by cutting the same and "burning" or soldering the pieces into the required forms. They may also have any suitable internal configuration or ornamentation.

This invention is also applicable to plumbing-traps. The traps are provided with sleeves or rings of solder at the extremities of their branches. The lead or other pipe to be connected with the trap is brought to its place, and the joint finished by the application of heat.

In addition to the advantages hereinbefore noted as attending my invention, I may add that the joints are made much stronger, and there is a very great economy in the amount of solder required, a mere film being used.

The sleeves described may be divided longitudinally into two or more sections, and used to repair bursted pipes.

Having now described my invention, and the manner in which the same is or may be carried into effect, what I claim, and desire to secure by Letters Patent, is—

1. The mode herein described of making solder-joints for lead and other pipes, the same consisting in the employment of a solder-lined metallic sleeve or tube, into which the contiguous ends of the pipes to be united are fitted, and there joined by the fusing of the solder lining, substantially as described.

2. Solder-lined metallic tubes or sleeves for joining the ends of lead and other pipes, substantially as set forth.

In testimony whereof I have hereunto signed my name this 27th day of April, A. D. 1874.

WM. ANTHONY SHAW.

Witnesses:
 EWELL DICK,
 HENRY R. ELLIOTT.